US012288518B2

(12) United States Patent
Lee et al.

(10) Patent No.: US 12,288,518 B2
(45) Date of Patent: Apr. 29, 2025

(54) ORGANIC LIGHT EMITTING DIODE DISPLAY DEVICE INCLUDING COMPENSATING UNIT AND METHOD DRIVING THE SAME

(71) Applicant: LG Display Co., Ltd., Seoul (KR)

(72) Inventors: Min-Jic Lee, Paju-si (KR); Ye-Seul Han, Paju-si (KR); Jeong-Ok Jo, Paju-si (KR); Kwang-Hyun Choi, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 319 days.

(21) Appl. No.: 17/967,682

(22) Filed: Oct. 17, 2022

(65) Prior Publication Data

US 2023/0206838 A1 Jun. 29, 2023

(30) Foreign Application Priority Data

Dec. 27, 2021 (KR) ........................ 10-2021-0188005

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/043* (2013.01); *G09G 2300/0842* (2013.01)

(58) Field of Classification Search
None
See application file for complete search history.

(56) References Cited

U.S. PATENT DOCUMENTS

| | | | | |
|---|---|---|---|---|
| 11,367,381 B2 * | 6/2022 | Cho | G09G 3/3233 | |
| 12,106,717 B2 * | 10/2024 | Kim | G09G 3/3291 | |
| 12,112,689 B2 * | 10/2024 | Li | G09G 3/3233 | |
| 2022/0084464 A1 * | 3/2022 | Lee | H10K 59/131 | |
| 2023/0197009 A1 * | 6/2023 | Kim | G09G 3/3233 | 345/55 |
| 2023/0206840 A1 * | 6/2023 | Lee | H10K 59/35 | 345/690 |
| 2023/0206863 A1 * | 6/2023 | Kim | G09G 3/3233 | 345/204 |

FOREIGN PATENT DOCUMENTS

| | | |
|---|---|---|
| KR | 10-2021-0078785 A | 6/2021 |
| KR | 10-2021-0085077 A | 7/2021 |

* cited by examiner

*Primary Examiner* — Fred Tzeng
(74) *Attorney, Agent, or Firm* — Birch, Stewart, Kolasch & Birch, LLP

(57) ABSTRACT

An organic light emitting diode display device can include a driving transistor, a first transistor connected to the driving transistor, a second transistor connected between a data voltage and the driving transistor, a third transistor connected between a high level voltage and the driving transistor, a fourth transistor connected to the driving transistor, a fifth transistor connected between an initial voltage and the driving transistor, a sixth transistor connected to the initial voltage, a seventh transistor connected to the high level voltage, an eighth transistor connected to a reference voltage, a storage capacitor connected between the driving transistor and the eighth transistor, and a light emitting diode connected between a low level voltage and the fourth transistor.

15 Claims, 11 Drawing Sheets

ORGANIC LIGHT EMITTING DIODE DISPLAY DEVICE INCLUDING COMPENSATING UNIT AND METHOD DRIVING THE SAME

CROSS-REFERENCE TO RELATED APPLICATIONS

The present application claims the priority benefit of Korean Patent Application No. 10-2021-0188005, filed in Republic of Korea on Dec. 27, 2021, which is hereby incorporated by reference herein in its entirety into the present application.

BACKGROUND

Technical Field

The present disclosure relates to an organic light emitting diode display device, and more particularly, to an organic light emitting diode display device including a compensating unit where a sufficient sensing time is obtained by independently driving two transistors connected to a gate electrode and a source electrode of a driving transistor, and to a method of driving the organic light emitting diode display device.

Discussion of the Related Art

Recently, with the advent of an information-oriented society, the interest in information displays for processing and displaying a massive amount of information and the demand for portable information media have increased. As such, a display field has rapidly advanced. Thus, various light and thin flat panel display devices have been developed and highlighted.

Among the various flat panel display devices, an organic light emitting diode (OLED) display device is an emissive type device that does not include a backlight unit used in a non-emissive type device such as a liquid crystal display (LCD) device. As a result, the OLED display device has advantages in a viewing angle, a contrast ratio and a power consumption to be applied to various fields.

In the OLED display device, each subpixel includes a compensating unit of various structures for compensating a threshold voltage of a driving transistor. A compensating unit of a structure of 10T1C where each subpixel includes eight transistors and one capacitor and a pixel having red, green and blue subpixels commonly includes two transistors, has been researched and developed.

In the OLED display device having the compensating unit of the structure of 10T1C, deterioration of a display quality of an image can be minimized by compensating a threshold voltage. However, since two transistors connected to a driving transistor and one transistor connected to a storage capacitor are switched according to one gate1 voltage (first-gate voltage), a data voltage writing and a threshold voltage sensing are performed for one horizontal period. As a result, a sensing time for a high frequency driving can be reduced.

SUMMARY OF THE DISCLOSURE

Accordingly, the present disclosure is directed to an organic light emitting diode display device and a method of driving the organic light emitting diode display device that substantially obviate one or more of the problems due to limitations and disadvantages of the related art.

An object of the present disclosure is to provide an organic light emitting diode display device including a compensating unit where a sensing time of a threshold voltage equal to or greater than two horizontal periods is obtained, deterioration of a display quality of an image is minimized and high speed driving of a high resolution and a high frequency is performed by driving two transistors connected to both electrodes of a storage capacitor with an additional gate voltage and a method of driving the organic light emitting diode display device.

Another object of the present disclosure is to provide an organic light emitting diode display device including a compensating unit where a leakage current through a gate electrode of a driving transistor can be reduced and a flicker in a low speed driving can be minimized by reducing a number of transistors connected to a gate electrode of a driving transistor and a method of driving the organic light emitting diode display device.

Additional features and advantages of the disclosure will be set forth in the description which follows, and in part will be apparent from the description, or can be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, an organic light emitting diode display device includes a driving transistor, a first transistor switched according to a third-gate voltage (e.g., gate3 voltage) and connected to the driving transistor, a second transistor switched according to a second-gate voltage (e.g., gate2 voltage) and connected between a data voltage and the driving transistor, a third transistor switched according to an emission voltage and connected between a high level voltage and the driving transistor, a fourth transistor switched according to the emission voltage and connected to the driving transistor, a fifth transistor switched according to a first-gate voltage (e.g., gate1 voltage) and connected between an initial voltage and the driving transistor, a sixth transistor switched according to a second-gate voltage (e.g., gate2 voltage) and connected to the initial voltage, a seventh transistor switched according the emission voltage and connected to the high level voltage, an eighth transistor switched according to the third-gate voltage and connected to a reference voltage, a storage capacitor connected between the driving transistor and the eighth transistor, and a light emitting diode connected between a low level voltage and the fourth transistor.

In another aspect, a method of driving an organic light emitting diode display device including first to eighth transistors, a storage capacitor and a light emitting diode includes during a first time period, turning on the first, fifth and eighth transistors, turning off the second, third, fourth, sixth and seventh transistors, and supplying an initial voltage and a reference voltage to first and second electrodes, respectively, of the storage capacitor; during a second time period, turning on the first, second, sixth and eighth transistors, turning off the third, fourth, fifth and seventh transistors, and supplying a data voltage to the first electrode of the storage capacitor; during a third time period, turning on the first and eighth transistors, and turning off the second, third, fourth, fifth, sixth and seventh transistors; and during a fourth time period, turning off the first, second, fifth, sixth and eighth transistors, turning on the third, fourth and seventh transistors, and supplying a high level voltage to the second electrode of the storage capacitor and the driving transistor.

It is to be understood that both the foregoing general description and the following detailed description are explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION OF THE EMBODIMENTS

Figure 1:
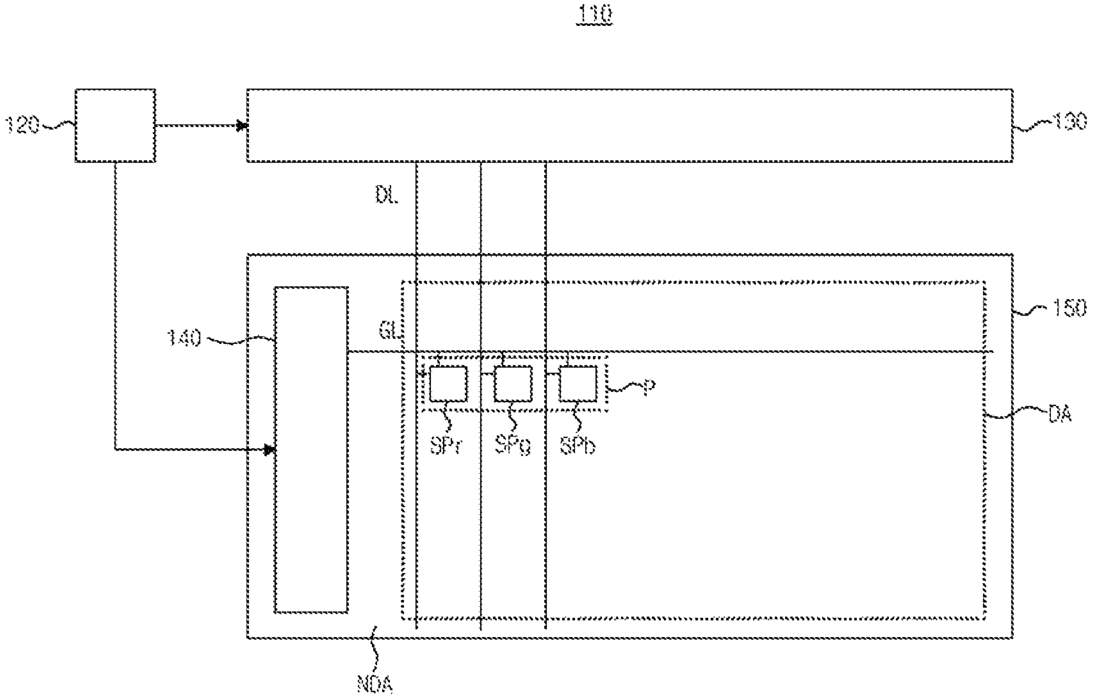
FIG. 1 is a view showing an organic light emitting diode display device according to a first embodiment of the present disclosure.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure can be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration can be omitted. In a case where terms “comprise,” “have,” and “include” described in the present specification are used, another part can be added unless a more limiting term, such as “only,” is used. The terms of a singular form can include plural forms unless referred to the contrary.

In construing an element, the element is construed as including an error or tolerance range even where no explicit description of such an error or tolerance range.

In describing a position relationship, when a position relation between two parts is described as, for example, “on,” “over,” “under,” or “next,” one or more other parts can be disposed between the two parts unless a more limiting term, such as “just” or “direct(ly),” is used.

It will be understood that, although the terms “first,” “second,” etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

Features of various embodiments of the present disclosure can be partially or overall coupled to or combined with each other, and can be variously inter-operated with each other and driven technically as those skilled in the art can sufficiently understand. Embodiments of the present disclosure can be carried out independently from each other, or can be carried out together in co-dependent relationship.

Hereinafter, an organic light emitting diode display device including a compensating unit according to embodiments of the present disclosure will be described in detail with reference to the accompanying drawings. All the components of each display device according to all embodiments of the present disclosure are operatively coupled and configured. Further, the terms such as “gate1 voltage”, “gate2 voltage”, “gate3 voltage”, etc. associated with scan/gate lines can be referred to as a “first-gate voltage”, “second-gate voltage”, “third-gate voltage”, etc., respectively.

In the following description, like reference numerals designate like elements throughout. When a detailed description of well-known functions or configurations related to this document is determined to unnecessarily cloud a gist of the inventive concept, the detailed description thereof will be omitted or will be made brief.

FIG. 1 is a view showing an organic light emitting diode display device according to a first embodiment of the present disclosure.

In FIG. 1, an organic light emitting diode (OLED) display device 110 according to the first embodiment of the present disclosure includes a timing controlling unit 120, a data driving unit 130, a gate driving unit 140 and a display panel 150.

The timing controlling unit 120 generates an image data, a data control signal and a gate control signal using an image signal and a plurality of timing signals including a data enable signal, a horizontal synchronization signal, a vertical synchronization signal and a clock signal transmitted from an external system such as a graphic card or a television system. The image data and the data control signal are transmitted to the data driving unit 130, and the gate control signal is transmitted to the gate driving unit 140.

The data driving unit 130 generates a data voltage (data signal) using the data control signal and the image data transmitted from the timing controlling unit 120 and transmits the data voltage to a data line DL of the display panel 150.

The gate driving unit 140 generates a gate voltage (gate signal or scan signal) and an emission voltage (emission signal) using the gate control signal transmitted from the timing controlling unit 120 and applies the gate voltage and the emission voltage to a gate line GL of the display panel 150.

The gate driving unit 140 can have a gate in panel (GIP) type to be formed in a non-display area NDA of a substrate of the display panel 150 having the gate line GL, the data line DL and a pixel P.

The display panel 150 includes a display area DA at a central portion thereof and a non-display area NDA surrounding the display area DA. The display panel 150 displays an image using the gate voltage, the emission voltage and the data voltage. For displaying an image, the display panel 150 includes a plurality of pixels P, a plurality of gate lines GL and a plurality of data lines DL in the display area DA.

For example, each of the plurality of pixels P can include red, green and blue subpixels SPr, SPg and SPb, and the gate line GL and the data line DL cross each other to define the red, green and blue subpixels SPr, SPg and SPb. Each of the red, green and blue subpixels SPr, SPg and SPb can be connected to the gate line GL and the data line DL.

A structure of each subpixel of the display panel 150 of the OLED display device 110 will be illustrated with reference to a drawing.

Figure 2:
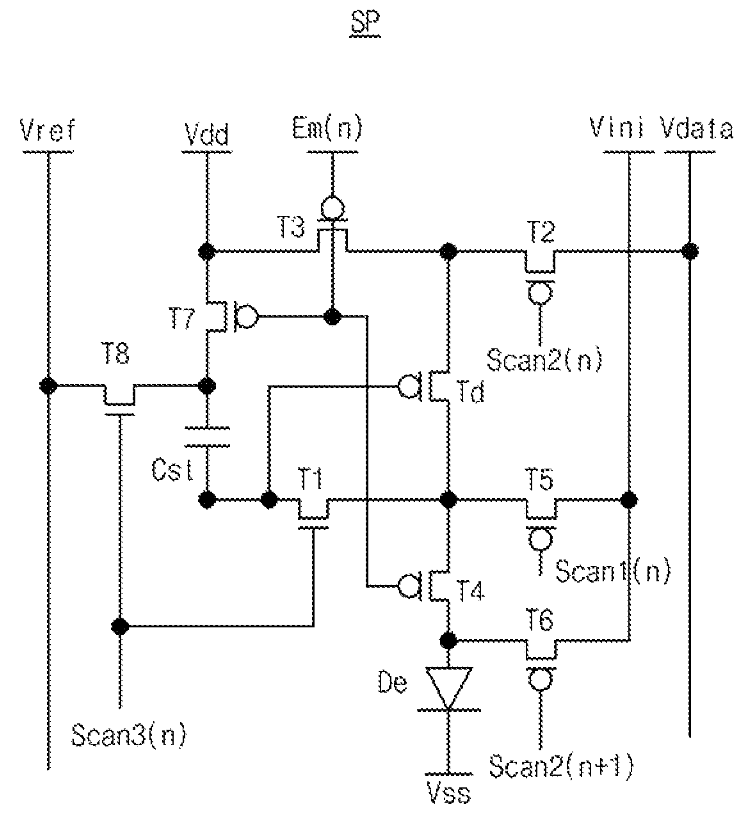
FIG. 2 is a circuit diagram showing a subpixel of the organic light emitting diode display device according to the first embodiment of the present disclosure.
Figure 3:
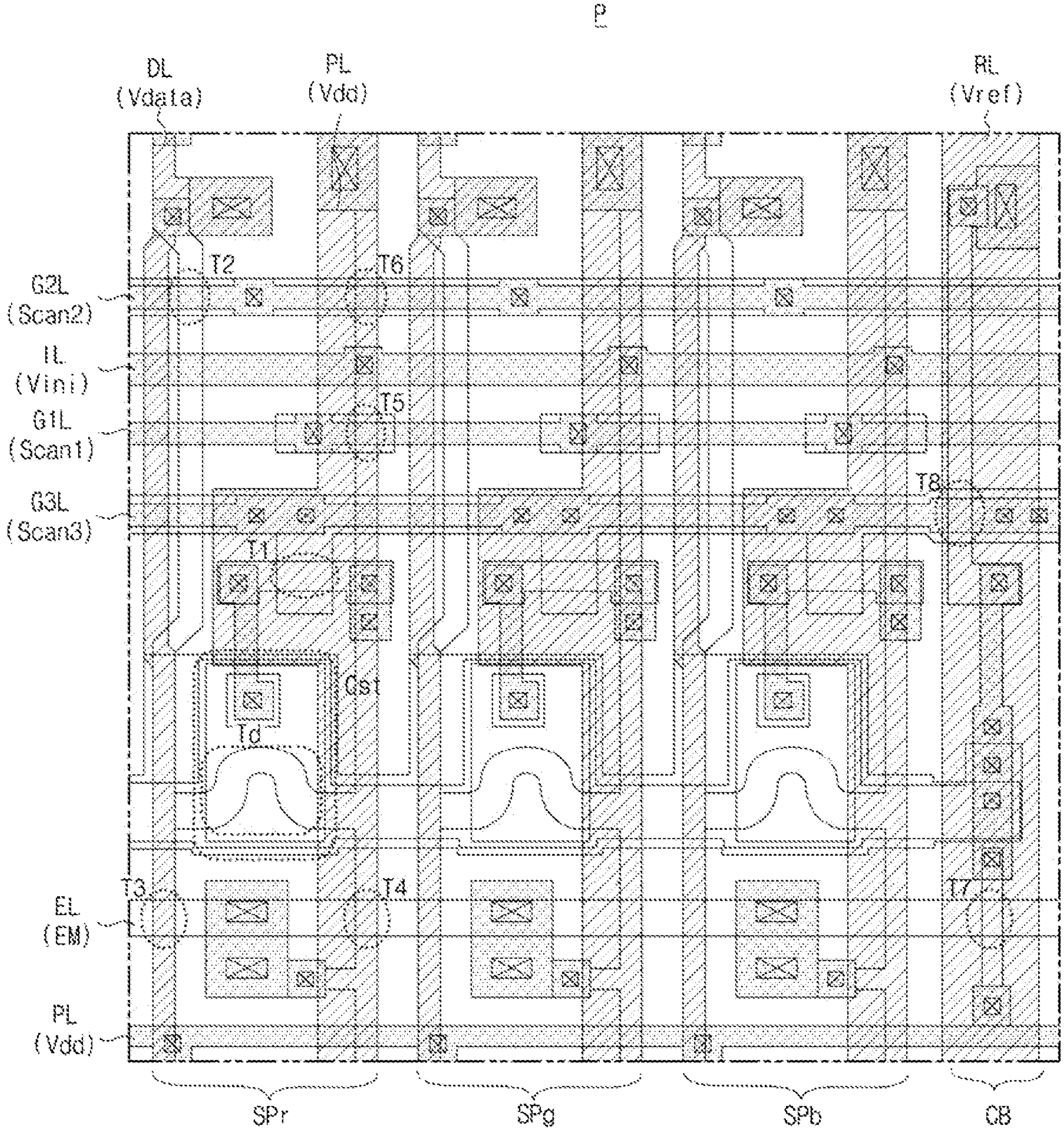
FIG. 3 is a plan view showing a pixel of the organic light emitting diode display device according to the first embodiment of the present disclosure.

FIG. 2 is a circuit diagram showing a subpixel of the organic light emitting diode display device according to the first embodiment of the present disclosure, and FIG. 3 is a plan view showing a pixel of the organic light emitting diode display device according to the first embodiment of the present disclosure.

In FIGS. 2 and 3, each pixel P of the display panel 150 of the OLED display device 110 according to the first embodiment of the present disclosure includes the red, green and blue subpixels SPr, SPg and SPb and a common block CB. Each subpixel SP includes a driving transistor Td, first to sixth transistors T1 to T6, a storage capacitor Cst and a light emitting diode De, and the common block CB includes seventh and eighth transistors T7 and T8.

The driving transistor Td, the first to sixth transistors T1 to T6, the storage capacitor Cst and the light emitting diode De are disposed in each subpixel SP, and the seventh and eighth transistors T7 and T8 are disposed in one pixel P constituted by the red, green and blue subpixels SPr, SPg and SPb.

For example, the driving transistor Td and the second to seventh transistors T2 to T7 can be a polycrystalline silicon thin film transistor of a positive type, and the first and eighth transistors T1 and T8 can be an oxide semiconductor thin film transistor of a negative type.

In FIG. 2, the driving transistor Td is switched (turned on and off) according to a voltage of a first electrode of the storage capacitor Cst. A gate electrode of the driving transistor Td is connected to the first electrode of the storage capacitor Cst and a drain electrode of a first transistor T1, a source electrode of the driving transistor Td is connected to a drain electrode of the second transistor T2 and a source electrode of the third transistor T3, and a drain electrode of the driving transistor Td is connected to a source electrode of the first transistor T1, a source electrode of the fourth transistor T4 and a drain electrode of the fifth transistor T5.

The first transistor T1 is switched (turned on and off) according to an nth gate3 voltage Scan3(*n*). A gate electrode of the first transistor T1 is connected to the nth gate3 voltage Scan3(*n*), the source electrode of the first transistor T1 is connected to the drain electrode of the driving transistor Td, the source electrode of the fourth transistor T4 and the drain electrode of the fifth transistor T5, and the drain electrode of the first transistor T1 is connected to the gate electrode of the driving transistor Td and the first electrode of the storage capacitor Cst.

The second transistor T2 of a switching transistor is switched (turned on and off) according to an nth gate2 voltage Scan2(*n*). A gate electrode of the second transistor T2 is connected to the nth gate2 voltage Scan2(*n*), a source electrode of the second transistor T2 is connected to the data voltage Vdata, and the drain electrode of the second transistor T2 is connected to the source electrode of the driving transistor Td and the source electrode of the third transistor T3.

The third transistor T3 is switched (turned on and off) according to an nth emission voltage Em(n). A gate electrode of the third transistor T3 is connected to the nth emission voltage Em(n), the source electrode of the third transistor T3 is connected to the drain electrode of the second transistor T2 and the source electrode of the driving transistor Td, and the drain electrode of the third transistor T3 is connected to a high level voltage Vdd and a source electrode of the seventh transistor T7.

The fourth transistor T4 of an emission transistor is switched (turned on and off) according to the nth emission voltage Em(n). A gate electrode of the fourth transistor T4 is connected to the nth emission voltage Em(n), a source electrode of the fourth transistor T4 is connected to the drain electrode of the driving transistor Td, the source electrode of the first transistor T1 and the drain electrode of the fifth transistor T5, and a drain electrode of the fourth transistor T4 is connected to a drain electrode of the sixth transistor T6 and an anode of the light emitting diode De.

The fifth transistor T5 is switched (turned on and off) according to an nth gate1 voltage Scan1(*n*). A gate electrode of the fifth transistor T5 is connected to the nth gate1 voltage Scan1(*n*), a source electrode of the fifth transistor T5 is connected to an initial voltage Vini and a source electrode of the sixth transistor T6, and the drain electrode of the fifth transistor T5 is connected to the drain electrode of the driving transistor Td, the source electrode of the first transistor T1 and the source electrode of the fourth transistor T4.

The sixth transistor T6 is switched (turned on and off) according to an (n+1)th gate2 voltage Scan2(*n*+1). A gate electrode of the sixth transistor T6 is connected to the (n+1)th gate2 voltage Scan2(*n*+1), a source electrode of the sixth transistor T6 is connected to an initial voltage Vini and the source electrode of the fifth transistor T5, and the drain electrode of the sixth transistor T6 is connected to the anode of the light emitting diode De and the drain electrode of the fourth transistor T4.

The seventh transistor T7 is switched (turned on and off) according to the nth emission voltage Em(n). A gate electrode of the seventh transistor T7 is connected to the nth emission voltage Em(n), the source electrode of the seventh transistor T7 is connected to the high level voltage Vdd and the drain electrode of the third transistor T3, and a drain electrode of the seventh transistor T7 is connected to a source electrode of the eighth transistor T8 and a second electrode of the storage capacitor Cst.

The eighth transistor T8 is switched (turned on and off) according to an nth gate3 voltage Scan3(*n*). A gate electrode of the eighth transistor T8 is connected to the nth gate3 voltage Scan3(*n*), the source electrode of the eighth transistor T8 is connected to the drain electrode of the seventh transistor T7 and the second electrode of the storage capacitor Cst, and a drain electrode of the eighth transistor T8 is connected to a reference voltage Vref.

The storage capacitor Cst stores the data voltage Vdata, the threshold voltage Vth and the high level voltage Vdd. The first electrode of the storage capacitor Cst is connected to the gate electrode of the driving transistor Td and the drain electrode of the first transistor T1, and the second electrode of the storage capacitor Cst is connected to the drain electrode of the seventh transistor T7 and the source electrode of the eighth transistor T8.

The light emitting diode De is connected between the fourth and sixth transistors T4 and T6 and the low level voltage Vss and emits a light of a luminance proportional to a current of the driving transistor Td. The anode of the light emitting diode De is connected to the drain electrode of the fourth transistor T4 and the drain electrode of the sixth transistor T6, and a cathode of the light emitting diode De is connected to the low level voltage Vss.

In FIG. 3, the OLED display device 110 according to a first embodiment of the present disclosure includes a plurality of gate1 lines G1L transmitting the gate1 voltage Scan1, a plurality of gate2 lines G2L transmitting the gate2 voltage Scan2, a plurality of gate3 lines G3L transmitting the gate3 voltage Scan3, a plurality of initial lines IL transmitting the initial voltage Vini, a plurality of emission lines EL transmitting the emission voltage Em, a plurality of data lines DL transmitting the data voltage Vdata, a plurality of power lines PL transmitting the high level voltage Vdd and a plurality of reference lines RL transmitting the reference voltage Vref.

The plurality of gate1 lines G1L, the plurality of gate2 lines G2L, the plurality of gate3 lines G3L, the plurality of initial lines IL and the plurality of emission lines EL are disposed parallel to a horizontal direction along a long side of the OLED display device 110, and the plurality of data lines DL and the plurality of reference lines RL are disposed parallel to a vertical direction along a short side of the OLED display device 110. The plurality of power lines PL are disposed parallel to the horizontal and vertical directions.

The data line DL and the power line PL of the vertical direction are disposed in each subpixel SP, and the reference line RL is disposed in the common block CB. The gate2 line G2L and the power line PL of the horizontal direction cross the data line DL and the power line PL of the vertical direction to define each subpixel SP.

For example, in each of the red, green and blue subpixels SPr, SPg and SPb, the gate2 line G2L, the initial line IL, the gate1 line G1L, the gate3 line G3L, the emission line EL and the power line PL of the horizontal direction can be sequentially disposed along the vertical direction, and the data line DL and the power line PL of the vertical direction can be sequentially disposed along the horizontal direction.

Each of the red, green and blue subpixels SPr, SPg and SPb includes the driving transistor Td, the first to sixth transistors T1 to T6, the storage capacitor Cst and the light emitting diode D, and the common block CB includes the seventh and eighth transistors T7 and T8. The seventh and eighth transistors T7 and T8 can overlap the reference line RL to be disposed within the reference line RL.

FIG. 3 shows the subpixel of an nth horizontal pixel line. The sixth transistor T6 of FIG. 3 can belong to the subpixel of an (n−1)th horizontal pixel line, and the sixth transistor T6 of the nth horizontal pixel line can be disposed in the subpixel of an (n+1)th horizontal pixel line.

During a display frame where the OLED display device 110 displays an image, the second transistor T2 connected between the data voltage Vdata and the driving transistor Td is switched according to the gate2 voltage Scan2, and the first and eighth transistors T1 and T8 connected to the first and second electrodes, respectively, of the storage capacitor Cst are switched according to the gate3 voltage Scan3. As a result, the sensing time of the threshold voltage equal to or longer than 2 horizontal periods (2H) is obtained.

During a reset frame where the OLED display device 110 resets the anode of the light emitting diode De, the initial voltage Vini is supplied to the anode of the light emitting diode De to initialize the anode of the light emitting diode De.

A driving method of the OLED display device will be illustrated with reference to drawings.

Figure 4:
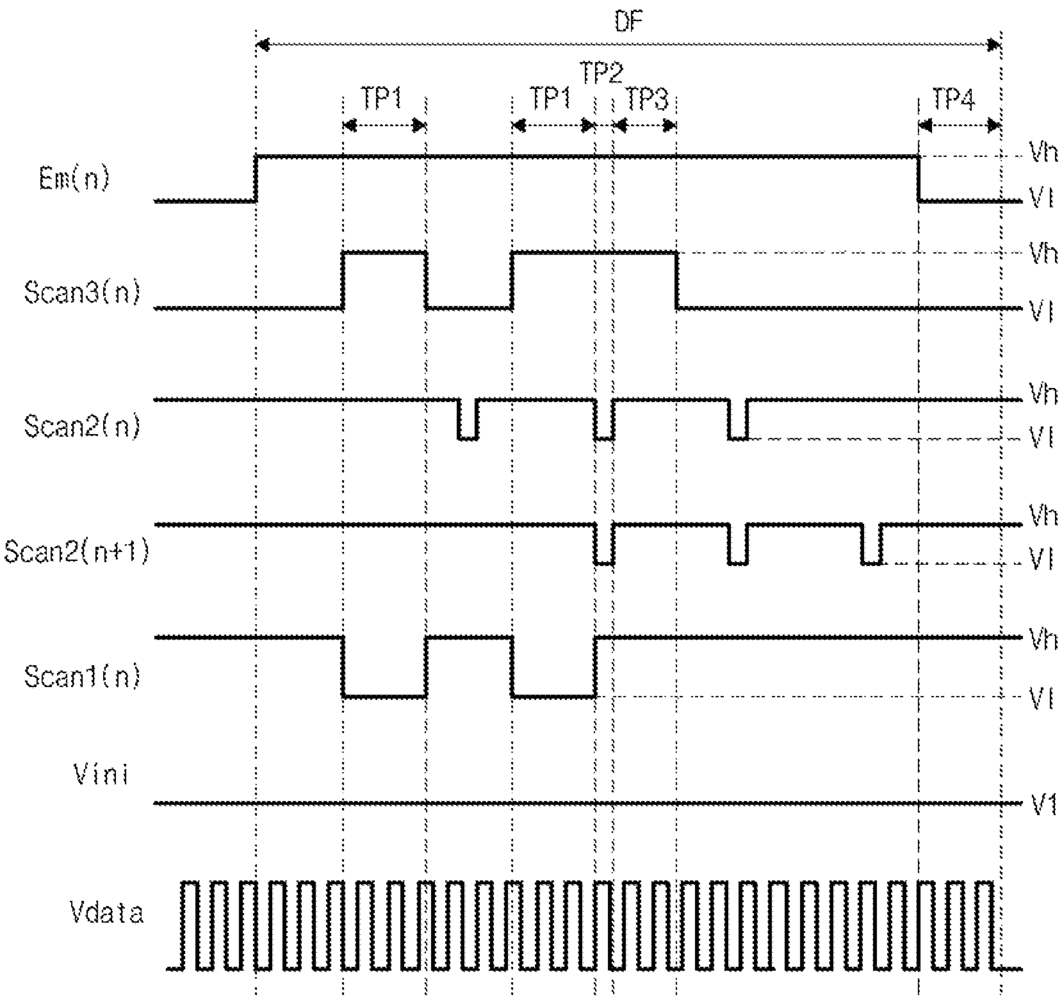
FIG. 4 is a view showing a plurality of signals of a display frame of the organic light emitting diode display device according to the first embodiment of the present disclosure.

FIG. 4 is a view showing a plurality of signals of a display frame of the organic light emitting diode display device according to the first embodiment of the present disclosure, and FIGS. 5A to 5D are views showing an operation of a subpixel of first to fourth time periods, respectively, of a display frame of the organic light emitting diode display device according to the first embodiment of the present disclosure.

In FIG. 4, a display frame DF for displaying an image includes a first time period TP1 of an initialization period of the gate electrode of the driving transistor Td, a second time period TP2 of a writing period of the data voltage to the gate electrode of the driving transistor Td and an initialization period of the anode of the light emitting diode De, a third time period TP3 of a sensing period of the threshold voltage Vth of the driving transistor Td and a fourth time period TP4 of an emission period of the light emitting diode De.

For example, a period where the nth emission voltage Em(n) has a high logic voltage Vh (the display frame DF except for the fourth time period TP4) can be about 64 horizontal periods (64H).

Figure 5A:
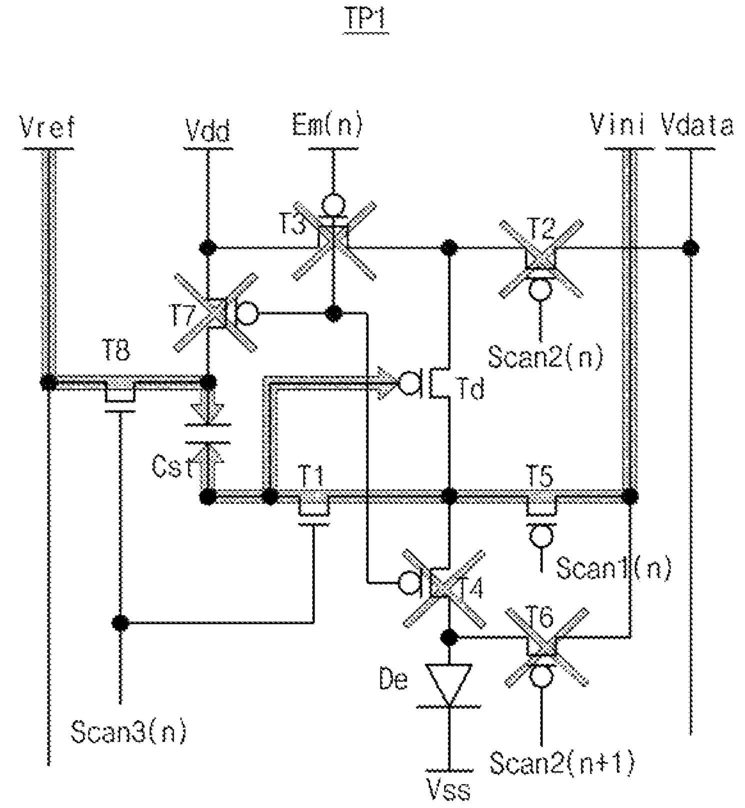
FIGS. 5A to 5D are views showing an operation of a subpixel of first to fourth time periods, respectively, of a display frame of the organic light emitting diode display device according to the first embodiment of the present disclosure.

In FIGS. 4 and 5A, during the first time period TP1, the nth emission voltage Em(n), the nth gate3 voltage Scan3(*n*), the nth gate2 voltage Scan2(*n*) and the (n+1)th gate2 voltage Scan2(*n*+1) become a high logic voltage Vh, and the nth gate1 voltage Scan1(*n*) becomes a low logic voltage V1. The first, fifth and eighth transistors T1, T5 and T8 are turned on, and the second, third, fourth, sixth and seventh transistors T2, T3, T4, T6 and T7 are turned off. As a result, the first and second electrodes of the storage capacitor Cst become the initial voltage Vini and the reference voltage Vref, respectively, such that the gate electrode of the driving transistor Td is initialized.

For example, the first time period TP1 can be divided into two separate sections for increasing the initialization period. The first time period can be about eight horizontal periods (8H), and a first voltage V1 of the initial voltage Vini can be about −5V.

Figure 5B:
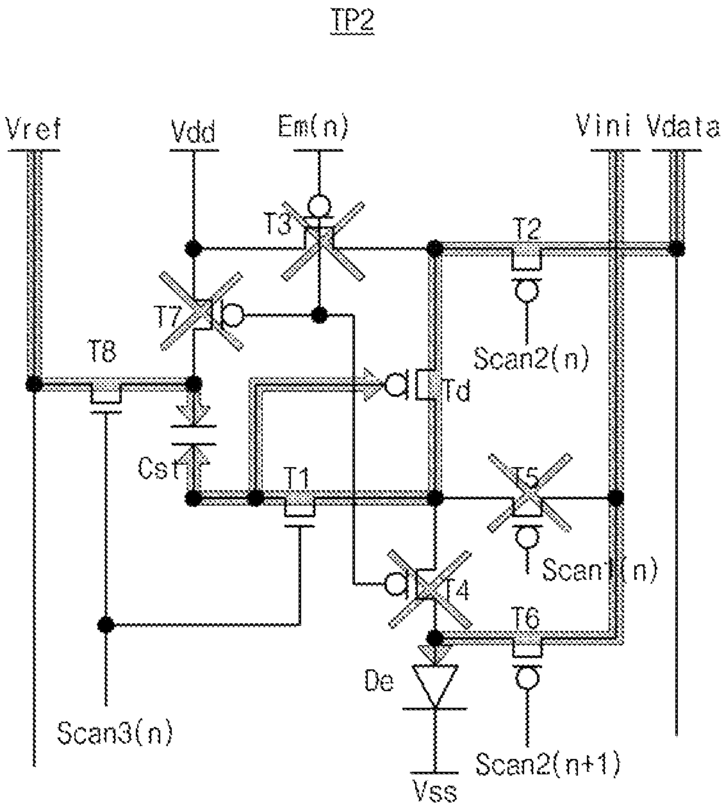

In FIGS. 4 and 5B, during the second time period TP2, the nth emission voltage Em(n), the nth gate3 voltage Scan3(*n*) and the nth gate1 voltage Scan1(*n*) become a high logic voltage Vh, and the nth gate2 voltage Scan2(*n*) and the (n+1) gate2 voltage Scan2(*n*+1) become a low logic voltage V1. The first, second, sixth and eighth transistors T1, T2, T6 and T8 are turned on, and the third, fourth, fifth and seventh transistors T3, T4, T5 and T7 are turned off. As a result, the first electrode of the storage capacitor Cst becomes the data voltage Vdata such that the data voltage Vdata is stored in the storage capacitor Cst.

For example, the second time period TP2 can be about one horizontal period (1H).

Figure 5C:
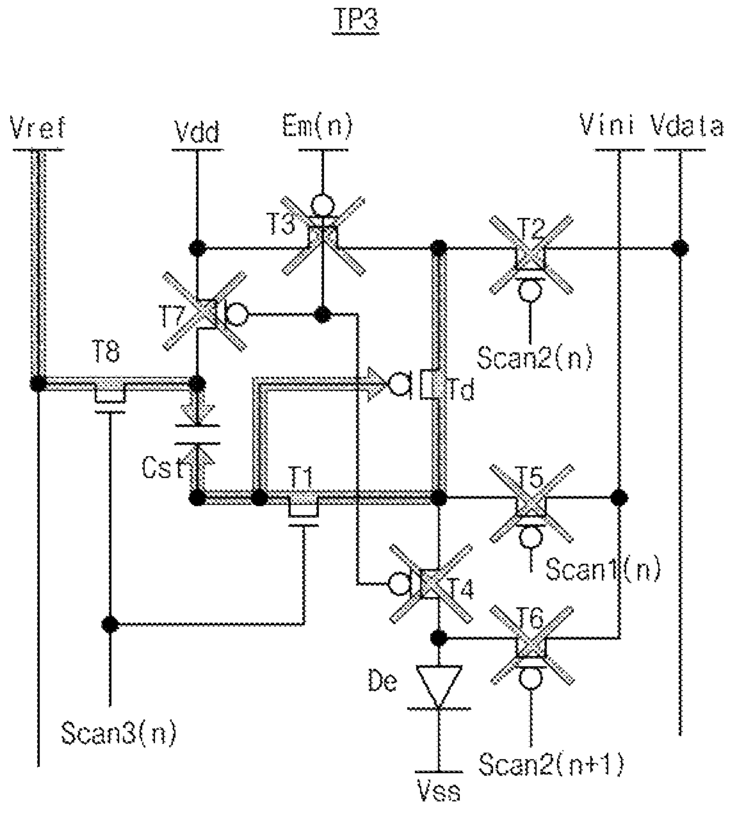

In FIGS. 4 and 5C, during the third time period TP3, the nth emission voltage Em(n), the nth gate3 voltage Scan3(*n*), the nth gate2 voltage Scan2(*n*), the (n+1) gate2 voltage Scan2(n+1) and the nth gate1 voltage Scan1(n) become a high logic voltage Vh. The first and eighth transistors T1 and T8 are turned on, and the second, third, fourth, fifth, sixth and seventh transistors T2, T3, T4, T5, T6 and T7 are turned off. As a result, the first electrode of the storage capacitor Cst becomes a sum (Vdata+Vth) of the data voltage Vdata and the threshold voltage Vth such that the sum (Vdata+Vth) is stored in the storage capacitor Cst.

For example, the third time period TP3 can be about seven horizontal periods (7H).

Figure 5D:
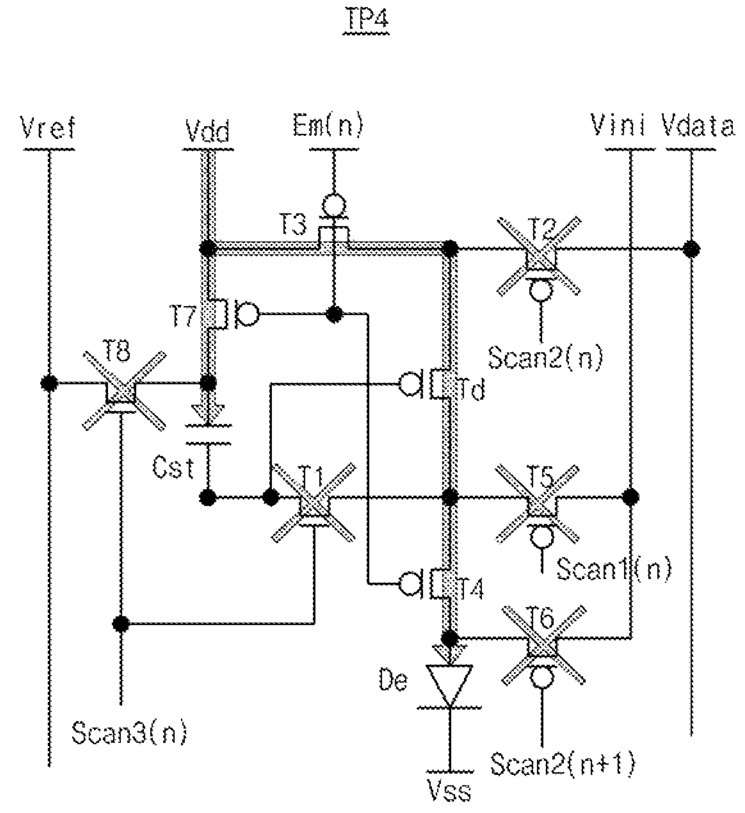

In FIGS. 4 and 5D, during the fourth time period TP4, the nth emission voltage Em(n) and the nth gate3 voltage Scan3(n) become a low logic voltage V1, and the nth gate2 voltage Scan2(n), the (n+1) gate2 voltage Scan2(n+1) and the nth gate1 voltage Scan1(n) become a high logic voltage Vh. The first, second, fifth, sixth and eighth transistors T1, T2, T5, T6 and T8 are turned off, and the third, fourth and seventh transistors T3, T4 and T7 are turned on. As a result, the second electrode of the storage capacitor Cst becomes the high level voltage Vdd, and the first electrode of the storage capacitor Cst becomes a value (Vdd−Vref+Vdata+Vth) obtained by adding a difference (Vdd−Vref) of the high level voltage Vdd and the reference voltage Vref to the sum (Vdata+Vth) of the data voltage Vdata and the threshold voltage Vth such that a current proportional to a square of a value (Vdata−Vref) obtained by subtracting the threshold voltage Vth from a gate-source voltage (Vgs=(Vg−Vs)=(Vdd−Vref+Vdata+Vth)−Vdd=Vdata−Vref+Vth) flows in the driving transistor Td, and the light emitting diode De emits a light of a luminance corresponding to the current flowing through the driving transistor Td.

Figure 6:
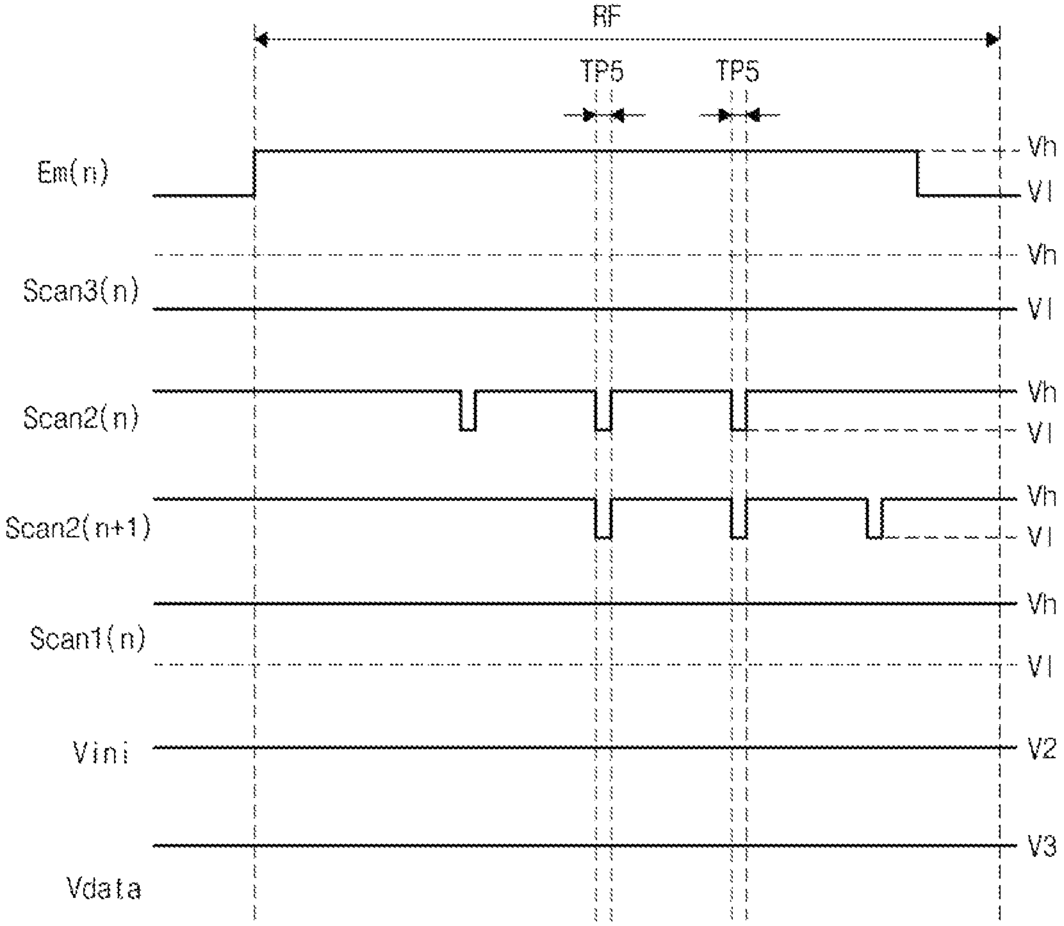
FIG. 6 is a view showing a plurality of signals of a reset frame of the organic light emitting diode display device according to the first embodiment of the present disclosure.
Figure 7:
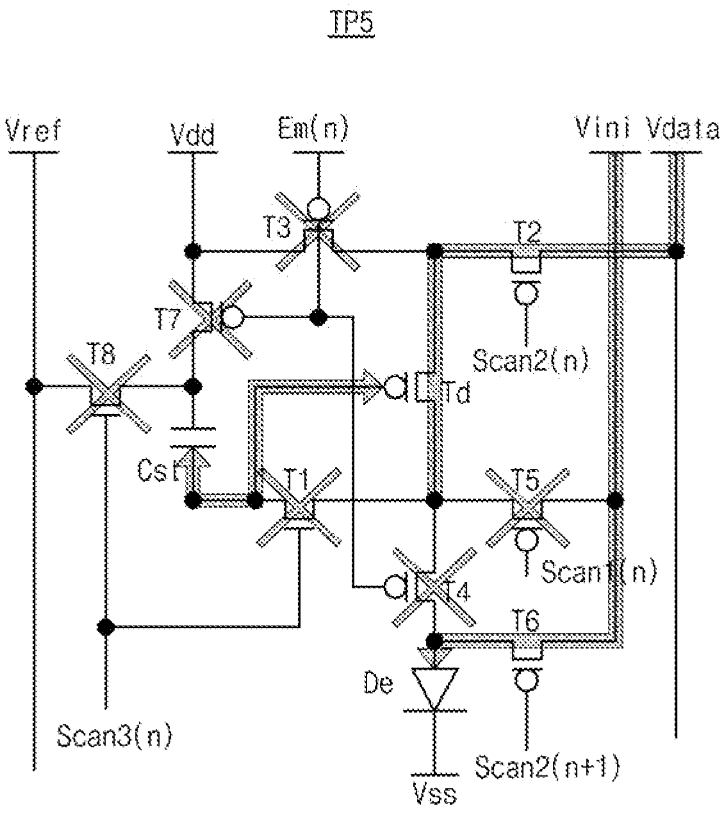
FIG. 7 is a view showing an operation of a subpixel of a fifth time period of a reset frame of the organic light emitting diode display device according to the first embodiment of the present disclosure.

FIG. 6 is a view showing a plurality of signals of a reset frame of the organic light emitting diode display device according to the first embodiment of the present disclosure, and FIG. 7 is a view showing an operation of a subpixel of a fifth time period of a reset frame of the organic light emitting diode display device according to the first embodiment of the present disclosure.

In FIG. 6, a reset frame RF for resetting the light emitting diode De includes a fifth time period TP5 of a reset period of the anode of the light emitting diode De.

For example, a period where the nth emission voltage Em(n) has a high logic voltage Vh can be about 64 horizontal periods (64H) and the fifth time period TP5 can be about 1 horizontal period (1H).

In FIGS. 6 and 7, during the fifth time period TP5, the nth emission voltage Em(n) and the nth gate1 voltage Scan1(n) become a high logic voltage Vh, and the nth gate3 voltage Scan3(n), the nth gate2 voltage Scan2(n) and the (n+1)th gate2 voltage Scan2(n+1) become a low logic voltage V1. The first, third, fourth, fifth, seventh and eighth transistors T1, T3, T4, T5, T7 and T8 are turned off, and the second and sixth transistors T2 and T6 are turned on. As a result, the anode of the light emitting diode De is initialized to the initial voltage Vini. A second voltage V2 of the initial voltage Vini can be greater than the first voltage V1 of the initial voltage Vini of the display frame DF.

For example, the second voltage V2 of the initial voltage Vini can be about 0V.

The data voltage Vdata can become a third voltage V3 of a constant value such that the first electrode of the storage capacitor Cst and the gate electrode of the driving transistor Td are maintained as the sum (Vdata+Vth) of the data voltage Vdata and the threshold voltage Vth.

For example, the third voltage V3 of the data voltage Vdata can be a maximum voltage that the data driving unit 130 can supply based on the gate-source voltage Vgs of the driving transistor Td.

Accordingly, in the OLED display device according to a first embodiment of the present disclosure, the light emitting diode De emits a light to display an image according to an operation of the driving transistor Td, the first to eighth transistors T1 to T8 and the storage capacitor Cst. The variation of the threshold voltage Vth, the variation of the high level voltage Vdd and deterioration of the light emitting diode De according to a use time are compensated using the subpixel SP, and the luminance can be adjusted by driving the light emitting diode De according to a duty ratio corresponding to an emission time.

In addition, during the display frame DF where the OLED display device 110 displays an image, the second transistor T2 connected between the data voltage Vdata and the driving transistor Td is switched according to the gate2 voltage Scan2, and the first and eighth transistors T1 and T8 connected to the first and second electrodes, respectively, of the storage capacitor Cst are switched according to the gate3 voltage Scan3. As a result, deterioration of a display quality of an image is minimized and a high speed driving of a high resolution and a high frequency is obtained due to the sensing time of the threshold voltage equal to or longer than 2 horizontal periods (2H).

Further, during the reset frame RF where the anode of the light emitting diode De is reset, the anode of the light emitting diode De is initialized by supplying the initial voltage Vini to the anode of the light emitting diode De.

In addition, since only the first transistor T1 is connected to the gate electrode of the driving transistor Td, the leakage current through the gate electrode of the driving transistor Td is reduced and a flicker of a low speed driving is minimized.

Further, since each subpixel includes nine transistors such as the driving transistor Td and the first to eighth transistors T1 to T8, the number of the transistors in each subpixel is reduced and a degree of design freedom increases.

In another embodiment, the first to eighth transistors T1 to T8 can be formed of a polycrystalline silicon.

Figure 8:
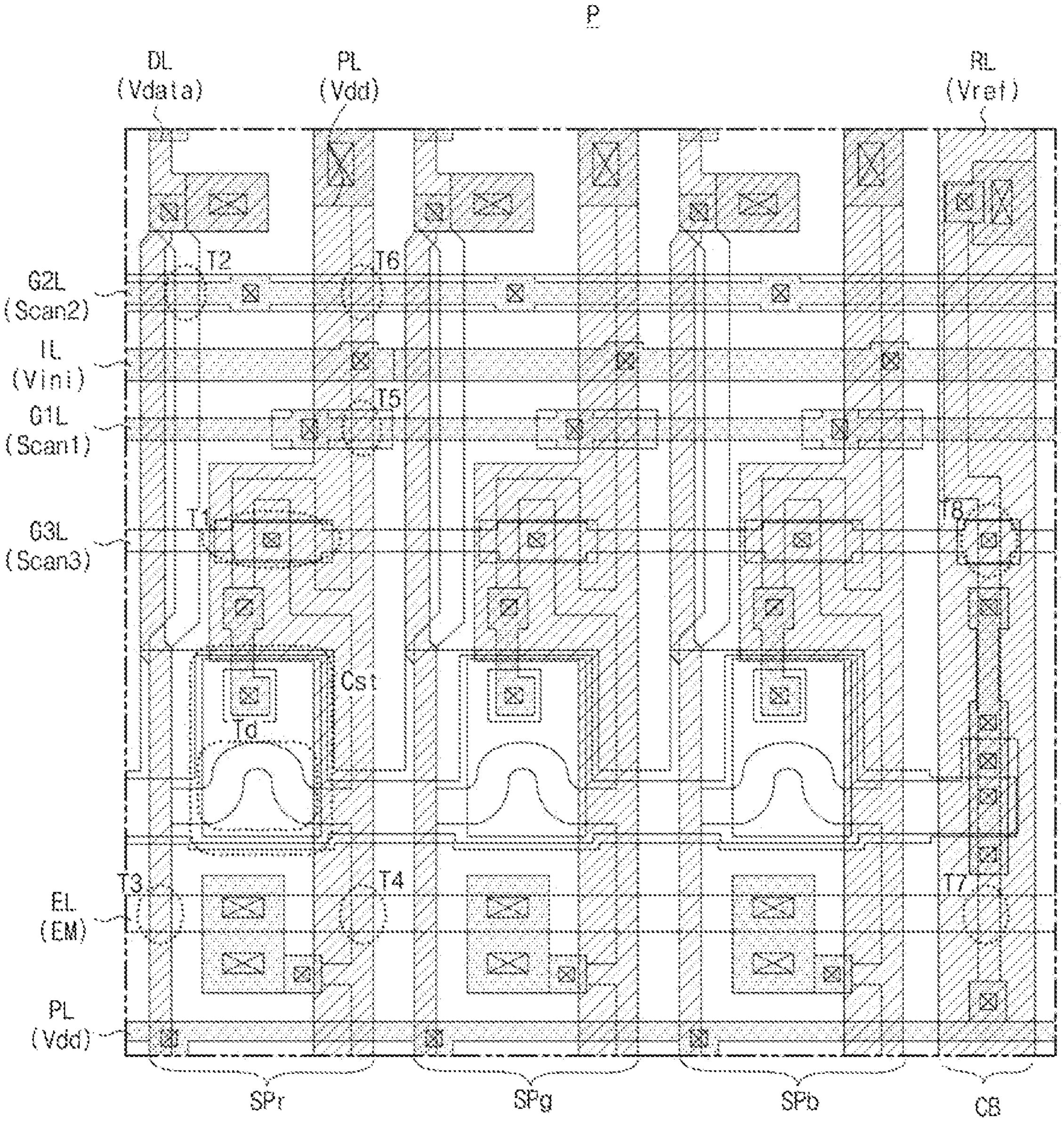
FIG. 8 is a plan view showing a pixel of an organic light emitting diode display device according to a second embodiment of the present disclosure.

FIG. 8 is a plan view showing a pixel of an organic light emitting diode display device according to a second embodiment of the present disclosure. Illustration on the part the same as that of the first embodiment will be omitted or may be briefly discussed.

In FIG. 8, a display panel of an organic light emitting diode (OLED) display device according to the second embodiment of the present disclosure includes a plurality of pixels, and each pixel includes red, green and blue subpixels SPr, SPg and SPb and a common block CB. Each subpixel SPr, SPg and SPb includes a driving transistor Td, first to sixth transistors T1 to T6, a storage capacitor Cst and a light emitting diode De, and the common block CB includes seventh and eighth transistors T7 and T8.

In addition, the display panel includes a plurality of gate1 lines G1L transmitting a gate1 voltage Scan1, a plurality of gate2 lines G2L transmitting a gate2 voltage Scan2, a plurality of gate3 lines G3L transmitting a gate3 voltage Scan3, a plurality of initial lines IL transmitting an initial voltage Vini, a plurality of emission lines EL transmitting an emission voltage Em, a plurality of data lines DL transmitting a data voltage Vdata, a plurality of power lines PL transmitting a high level voltage Vdd and a plurality of reference lines RL transmitting a reference voltage Vref.

The plurality of gate1 lines G1L, the plurality of gate2 lines G2L, the plurality of gate3 lines G3L, the plurality of initial lines IL and the plurality of emission lines EL are disposed parallel to a horizontal direction along a long side of the OLED display device, and the plurality of data lines DL and the plurality of reference lines RL are disposed parallel to a vertical direction along a short side of the OLED display device. The plurality of power lines PL are disposed parallel to the horizontal and vertical directions.

The data line DL and the power line PL of the vertical direction are disposed in each subpixel SP, and the reference line RL is disposed in the common block CB. The gate2 line G2L and the power line PL of the horizontal direction cross the data line DL and the power line PL of the vertical direction to define each of the red, green and blue subpixels SPr, SPg and SPb.

For example, in each of the red, green and blue subpixels SPr, SPg and SPb, the gate2 line G2L, the initial line IL, the gate1 line G1L, the gate3 line G3L, the emission line EL and the power line PL of the horizontal direction can be sequentially disposed along the vertical direction, and the data line DL and the power line PL of the vertical direction can be sequentially disposed along the horizontal direction.

Each of the red, green and blue subpixels SPr, SPg and SPb includes the driving transistor Td, the first to sixth transistors T1 to T6, the storage capacitor Cst and the light emitting diode De, and the common block CB includes the seventh and eighth transistors T7 and T8. The seventh and eighth transistors T7 and T8 can overlap the reference line RL to be disposed within the reference line RL. The driving transistor Td and the first to eighth transistors T1 to T8 can be a polycrystalline silicon thin film transistor of a positive type.

Although the first transistor T1 of each of the red, green and blue subpixels SPr, SPg and SPb exemplarily has a dual gate type and is disposed to overlap the gate3 line G3L together with the eighth transistor T8 of the common block CB in the second embodiment of FIG. 8, the first transistor T1 can have a single gate type and can be disposed to protrude from the gate3 line G3L in another embodiment as in the first embodiment.

FIG. 8 shows the subpixel of an nth horizontal pixel line. The sixth transistor T6 of FIG. 8 can belong to the subpixel of an (n−1)th horizontal pixel line, and the sixth transistor T6 of the nth horizontal pixel line can be disposed in the subpixel of an (n+1)th horizontal pixel line.

The circuit structure of each subpixel SP of the second embodiment is the same as that of the first embodiment except that the first and eighth transistors T1 and T8 are a polycrystalline silicon thin film transistor of a positive type. The gate3 voltage Scan3 supplied to the gate electrode of the first and eighth transistors T1 and T8 can have an opposite polarity to the gate3 voltage Scan3 of FIG. 4 and FIG. 6 of the first embodiment.

During a display frame where the OLED display device displays an image, the second transistor T2 connected between the data voltage Vdata and the driving transistor Td is switched according to the gate2 voltage Scan2, and the first and eighth transistors T1 and T8 connected to the first and second electrodes, respectively, of the storage capacitor Cst are switched according to the gate3 voltage Scan3. As a result, the sensing time of the threshold voltage equal to or longer than 2 horizontal periods (2H) is obtained.

During a reset frame where the OLED display device resets the anode of the light emitting diode De, the initial voltage Vini is supplied to the anode of the light emitting diode De to initialize the anode of the light emitting diode De.

Consequently, in the OLED display device according to the present disclosure, since the two transistors connected to the first and second electrodes of the storage capacitor are driven with an additional gate voltage, deterioration of the display quality of an image is minimized and a high speed driving of a high resolution and a high frequency is obtained due to the sensing time of the threshold voltage equal to or longer than 2 horizontal periods (2H).

In addition, since the number of transistors connected to the gate electrode of the driving transistor is reduced, the leakage current through the gate electrode of the driving transistor is reduced and a flicker of a low speed driving is minimized.

Further, since the threshold voltage and the high level voltage are charged to the gate electrode of the driving transistor in the emission period, the high level voltage as well as the threshold voltage is compensated.

In addition, since the number of the transistors in the subpixel and the pixel is reduced, a degree of design freedom for each subpixel increases.

It will be apparent to those skilled in the art that various modifications and variation can be made in the present disclosure without departing from the scope of the disclosure. Thus, it is intended that the present disclosure cover the modifications and variations of this disclosure provided they come within the scope of the appended claims.

What is claimed is:

1. An organic light emitting diode display device, comprising:
- a driving transistor;
- a first transistor switched according to a third-gate voltage and connected to the driving transistor;
- a second transistor switched according to a second-gate voltage different from the third-gate voltage and connected between a data voltage and the driving transistor;
- a third transistor switched according to an emission voltage and connected between a high level voltage and the driving transistor;
- a fourth transistor switched according to the emission voltage and connected to the driving transistor;
- a fifth transistor switched according to a first-gate voltage and connected between an initial voltage and the driving transistor;
- a sixth transistor switched according to the second-gate voltage and connected to the initial voltage;
- a seventh transistor switched according the emission voltage and connected to the high level voltage;
- an eighth transistor switched according to the third-gate voltage and connected to a reference voltage;
- a storage capacitor connected between the driving transistor and the eighth transistor; and
- a light emitting diode connected between a low level voltage and the fourth transistor.

2. The display device of claim 1, wherein the driving transistor and the second to seventh transistors are a polycrystalline silicon thin film transistor of a positive type, and the first and eighth transistors are one of an oxide semiconductor thin film transistor of a negative type and a polycrystalline silicon thin film transistor of a positive type.

3. The display device of claim 1, wherein the seventh and eighth transistors overlap a reference line transmitting the reference voltage to be disposed within the reference line.

4. The display device of claim 1, wherein the first and eighth transistors are a polycrystalline silicon thin film transistor of a positive type, and the first and eighth transistors are disposed to overlap a third-gate line transmitting the third-gate voltage.

5. The display device of claim 1, wherein a display frame for displaying an image includes first to fourth time periods, and wherein:

during the first time period, the emission voltage, the third-gate voltage and the second-gate voltage have a high logic voltage, and the first-gate voltage has a low logic voltage;

during the second time period, the emission voltage, the third-gate voltage and the first-gate voltage have a high logic voltage, and the second-gate voltage has a low logic voltage;

during the third time period, the emission voltage, the third-gate voltage, the second-gate voltage and the first-gate voltage have a high logic voltage; and during the fourth time period, the emission voltage and the third-gate voltage have a low logic voltage, and the second-gate voltage and the first-gate voltage have a high logic voltage.

6. The display device of claim 5, wherein the third time period is equal to or longer than 2 horizontal periods.

7. The display device of claim 5, wherein:

during the first time period, the first, fifth and eighth transistors are turned on, the second, third, fourth, sixth and seventh transistors are turned off, and first and second electrodes of the storage capacitor have the initial voltage and the reference voltage, respectively;

during the second time period, the first, second, sixth and eighth transistors are turned on, the third, fourth, fifth and seventh transistors are turned off, and the first electrode of the storage capacitor has the data voltage;

during the third time period, the first and eighth transistors are turned on, the second, third, fourth, fifth, sixth and seventh transistors are turned off, and the first electrode of the storage capacitor has a sum of the data voltage and a threshold voltage; and during the fourth time period, the first, second, fifth, sixth and eighth transistors are turned off, the third, fourth and seventh transistors are turned on, the second electrode of the storage capacitor has the high level voltage, and the first electrode of the storage capacitor has a value obtained by adding a difference of the high level voltage and the reference voltage to the sum of the data voltage and the threshold voltage.

8. The display device of claim 1, wherein a reset frame for resetting the light emitting diode includes a fifth time period, and wherein, during the fifth time period, the emission voltage and the first-gate voltage have a high logic voltage, and the third-gate voltage and the second-gate voltage have a low logic voltage.

9. The display device of claim 8, wherein, during the fifth time period, the first, third, fourth, fifth, seventh and eighth transistors are turned off, the second and sixth transistors are turned on, and an anode of the light emitting diode has the initial voltage.

10. The display device of claim 1, further comprising:

a second-gate line transmitting the second-gate voltage, an initial line transmitting the initial voltage, a first-gate line transmitting the first-gate voltage, a third-gate line transmitting the third-gate voltage and an emission line transmitting the emission voltage; and a data line transmitting the data voltage, a power line transmitting the high level voltage and a reference line transmitting the reference voltage.

11. The display device of claim 10, wherein the second-gate line, the initial line, the first-gate line, the third-gate line and the emission line are disposed parallel to each other along a horizontal direction, and wherein the data line, the power line and the reference line are disposed parallel to each other along a vertical direction.

12. The display device of claim 1, wherein a gate electrode of the first transistor is connected directly to the third-gate voltage, a gate electrode of the second transistor is connected directly to the second-gate voltage, and a gate electrode of the eighth transistor is connected directly to the third-gate voltage.

13. The display device of claim 1, wherein the fifth transistor is connected directly between the initial voltage and the driving transistor, and the sixth transistor is connected directly between the initial voltage and the fourth transistor.

14. A method of driving an organic light emitting diode display device including first to eighth transistors, a storage capacitor and a light emitting diode, the method comprising:

during a first time period, turning on the first, fifth and eighth transistors, turning off the second, third, fourth, sixth and seventh transistors, and supplying an initial voltage and a reference voltage to first and second electrodes, respectively, of the storage capacitor;

during a second time period, turning on the first, second, sixth and eighth transistors, turning off the third, fourth, fifth and seventh transistors, and supplying a data voltage to the first electrode of the storage capacitor;

during a third time period, turning on the first and eighth transistors, turning off the second, third, fourth, fifth, sixth and seventh transistors, and supplying a sum of the data voltage and a threshold voltage to the first electrode of the storage capacitor; and during a fourth time period, turning off the first, second, fifth, sixth and eighth transistors, turning on the third, fourth and seventh transistors, and supplying a high level voltage to the second electrode of the storage capacitor and the driving transistor, and supplying a value obtained by adding a difference of the high level voltage and the reference voltage to the sum of the data voltage and the threshold voltage to the first electrode of the storage capacitor.

15. The method of claim 14, further comprising:

during a fifth time period, turning off the first, third, fourth, fifth, seventh and eighth transistors, turning on the second and sixth transistors, and supplying the initial voltage to an anode of the light emitting diode.

* * * * *